United States Patent
Liu et al.

(10) Patent No.: US 7,221,872 B2
(45) Date of Patent: May 22, 2007

(54) ON-LINE DISPERSION COMPENSATION DEVICE FOR A WAVELENGTH DIVISION OPTICAL TRANSMISSION SYSTEM

(75) Inventors: Heliang Liu, Shenzhen (CN); Qianjin Xiong, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 343 days.

(21) Appl. No.: 10/702,186

(22) Filed: Nov. 5, 2003

(65) Prior Publication Data
US 2004/0091272 A1    May 13, 2004

Related U.S. Application Data

(63) Continuation of application No. PCT/CN02/00476, filed on Jul. 5, 2002.

(30) Foreign Application Priority Data
Dec. 23, 2001  (CN) ................. 01 1 45243

(51) Int. Cl.
*H04B 14/02* (2006.01)
*H04B 10/18* (2006.01)
(52) U.S. Cl. .................. 398/81; 398/149; 398/84
(58) Field of Classification Search ............ 398/81–84, 398/149
See application file for complete search history.

(56) References Cited

U.S. PATENT DOCUMENTS 5,982,518 A * 11/1999 Mizrahi ........................ 398/84
5,982,963 A    11/1999 Feng et al.
6,271,952 B1 *  8/2001 Epworth ..................... 398/147
6,292,601 B1 *  9/2001 Laming et al. ............... 385/24
6,552,834 B2 *  4/2003 Bhatia et al. ................ 398/87
6,577,424 B1 *  6/2003 Lin ............................. 385/27
6,748,176 B1 *  6/2004 Inagaki et al. ............... 398/85
2001/0013966 A1  8/2001 Ishida et al.

FOREIGN PATENT DOCUMENTS

CA        2247315      8/1997

* cited by examiner

*Primary Examiner*—Leslie Pascal

(57) ABSTRACT

The invention discloses an on-line dispersion compensation device for a wavelength division optical transmission system. The device is consisted of two optical path selectors and at least one chirped grating fiber unit. The chirped grating fiber unit is consisted of two chirped grating fibers with same wavelength band and connected oppositely. In addition, the chirped grating fiber unit is serially connected between the appropriate ports of the two optical path selectors. The invention applies a structure that combines a chirped grating fiber unit with two optical path selectors. The structure is suitable to on-line dispersion compensation in a DWDM system and has low insertion loss. When only a few wavelengths need to be compensated, the structure makes dispersion compensation with low cost, low insertion loss and compensating a large dispersion value. For single channel or broadband compensation, the invention provides dispersion compensation without through OADM or MUX/DEMUX filtering. For an urban area network system with rare high-speed service, the invention provides a low cost solution for dispersion compensation, and the structure of the device is suitable for structure design of the integrated waveguide dispersion compensation.

4 Claims, 2 Drawing Sheets

ON-LINE DISPERSION COMPENSATION DEVICE FOR A WAVELENGTH DIVISION OPTICAL TRANSMISSION SYSTEM

CROSS-REFERENCE TO RELATED APPLICATIONS

This application is a continuation of PCT/CN02/00476 filed on Jul. 5, 2002. This application claims the benefit of Chinese Patent Application No. 01145243.9 filed on Dec. 23, 2001. The disclosures of the above applications are incorporated herein by reference.

FIELD OF THE INVENTION

The present invention relates generally to a dispersion compensation device for an optical transmission system, and more particularly to an on-line dispersion compensation device for a wavelength division high-speed optical transmission system.

BACKGROUND OF THE INVENTION

In a high-speed optical transmission system, dispersion is an important factor that limits the transmission distance of the system. Especially, for a 10G and higher speed single channel and broadband system, dispersion compensation is an important issue should be considered for optical transmission apparatus development. In a high-speed optical transmission system, usually there are two kinds of dispersion compensation: dispersion compensation fiber (DCF) used for broadband dispersion compensation, and dispersion compensation grating (DCG) used for single channel dispersion compensation. Of course, there are other technologies, such as pre-chirped manner, decision and feedback manner, etc.

At present usually a broadband DCF segmented dispersion compensation is applied for a dense wavelength division multiplexing (DWDM) system. When using a broadband or narrowband DCF for dispersion compensation, usually the DCF is connected to transmitting end of the optical transmitter, receiving end of the optical receiver or optical repeater. Advantages of this dispersion compensation method are as follow. Working band is wide, so the broadband dispersion can be implemented. Devices are not sensitive with temperature, so it is a low requirement for working condition. The technology is mature, so it is suitable for chain network or DWDM system having more wavelengths. The disadvantage of this dispersion compensation method is larger attenuation, so it is necessary to have optical amplifier to compensate optical power, and this will increase cost. In addition, usually urban network architecture is a ring network. High-speed services in a ring network have different distances and not all services are high-speed service, so not all services need to be compensated. If in an urban wavelength division system, there are only a few wavelengths needs to be compensated, then using DCF will have higher cost. Moreover, with this method, threshold-value of nonlinear optical effect is low, so input power of the fiber needs to be controlled; and there is larger polarization mode dispersion (PMD).

For network with a few wavelengths carrying high-speed service, DCG is deployed for dispersion compensation in order to reduce cost. The DCG deploys a single channel dispersion compensation module consisted of a chirped grating fiber plus a circulator. If a wavelength needs to make dispersion compensation, then an Optical Add/Drop Module (OADM) or a De-Multiplexer/Multiplexer (DEMUX/MUX) is used to filter the wavelength and the filtered wavelength is inputted to a dispersion compensation module for making dispersion compensation. After the filtered wavelength has been compensated, it is added or multiplexed to a transmission fiber though OADM or MUX. Mostly, this manner is applied in a more than 10G single wavelength high-speed SDH optical transmission system. Advantages of this manner are the insertion loss is small, nonlinear effect is not obvious and the technology is mature. Disadvantages of this manner are an inserted add/drop module will increase insertion loss and cost, especially it cannot make on-line dispersion compensation for a wavelength.

Besides, a pre-chirped manner and decision and feedback manner is immature. There is another manner of using electrical relay to make 3R regeneration of a signal, but it is too expensive.

SUMMARY OF THE INVENTION

It is, therefore, an object of the invention provides a device of on-line dispersion compensation for an urban wavelength division optical transmission system. The device will compensate a few wavelengths dispersion of a high-speed (10 Gbs or 40 Gbs) optical signal without affecting other wavelengths optical signal transmission and will be suitable for future optical waveguide integrated manufacture.

The invention is an on-line dispersion compensation device for a wavelength division optical transmission system. The device includes two optical path selectors and at least one chirped grating fiber unit. The chirped grating fiber unit is consisted of two chirped grating fibers with same wavelength band and connected oppositely. The chirped grating fiber unit is serially connected between the appropriate ports of two optical path selectors. Input port of one optical path selector is connected with input optical signal, and the output port of its last stage is connected with the input port of another optical path selector. The last stage output of another optical path selector is the optical signal output.

According to the device of the invention, said chirped grating fiber unit is consisted of two opposite portions of chirped grating fibers written on a fiber segment or two chirped grating fibers melted together. The chirped grating fiber bandwidth can be one wavelength or multiple wavelengths or tunable wavelengths.

According to the device of the invention, said optical path selector can be a circulator, and a chirped grating fiber unit is serially connected between two circulators. Two ports of the chirped grating fiber unit are connected with the second port of the two circulators, respectively. The first port of the first circulator is the optical signal input. The third port of the first circulator is connected with the first port of the second circulator. The third port of the second circulator is the optical signal output.

According to the device of the invention, said optical path selector can also be a 2*2 optical coupler, and two chirped grating fiber units are connected between the two couplers. One port of the two chirped grating fiber units is respectively connected with two arms of one port of the first coupler. Another port of the two chirped grating fiber units is respectively connected with two arms of one port of the second coupler. One arm of another port of the first coupler is connected with the optical signal input. One arm of another port of the second coupler is connected with the optical signal output. Another arm of another port of the first coupler is connected with another arm of another port of the second coupler.

The invention applies a structure that combines a chirped grating fiber unit with two optical path selectors. The structure is suitable to on-line dispersion compensation in a DWDM system and has low insertion loss. When only a few wavelengths need to be compensated, the structure makes dispersion compensation with low cost, low insertion loss and compensating a large dispersion value, corresponding to two chirped grating fibers dispersion. The further advantage of the invention is that it can make on-line dispersion compensation with low insertion loss. For single channel or broadband compensation, the invention provides dispersion compensation without through OADM or MUX/DEMUX filtering. For an urban area network system with rare high-speed service, the invention provides a low cost solution for dispersion compensation. The structure of the device is suitable for structure design of the integrated waveguide dispersion compensation. It corresponds to combine OADM and dispersion compensation together, so multiplexing and de-multiplexing are unnecessary. Since in the waveguide integration, it is easy to integrate 3 dB couplers or circulators with waveguide gratings. Consequently, connection structure of the dispersion compensation device of the invention is suitable to waveguide integrated technology and has advantage for the future waveguide integrated manufacture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
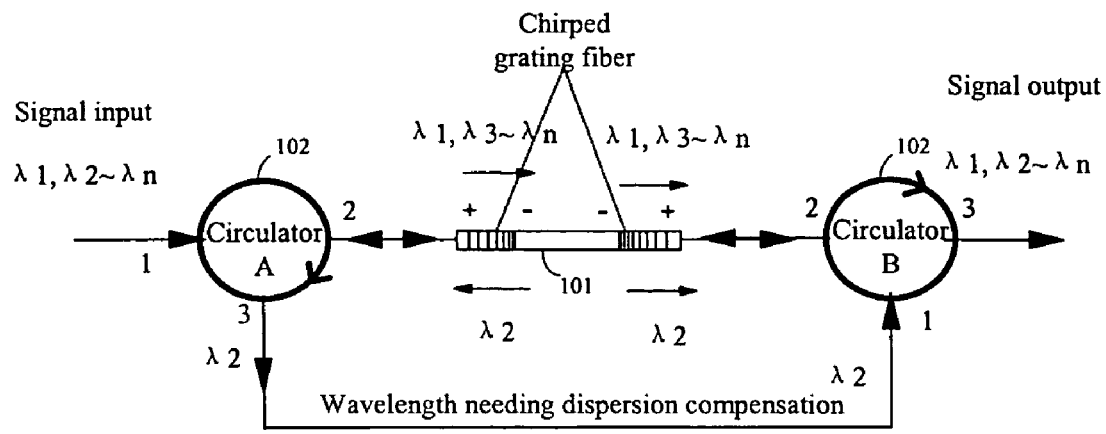
FIG. 1 shows a schematic diagram of the first scheme of the first embodiment.

As shown in FIG. 1, in the embodiment the on-line dispersion compensation device is consisted of two optical path selectors and a chirped grating fiber unit 101. A circulator 102 is applied as the optical path selector. The chirped grating fiber unit 101 includes two chirped grating fibers which are written on a segment of fiber and are set oppositely. Negative poles of the two chirped grating fiber are connected together. The chirped grating fiber unit 101 is serially connected between two circulators 102. Port 2 of circulator A102 is connected with the positive pole of one chirped grating fiber of the chirped grating fiber unit 101. Port 2 of circulator B102 is connected with the positive pole of another chirped grating fiber of the chirped grating fiber unit 101. Port 3 of circulator A102 is melted with port 1 of circulator B102. Port 1 of circulator A102 is the input and port 3 of circulator B102 is the output.

The dispersion compensation procedure is as follow. An optical signal consisted of multiple wavelengths $\lambda 1, \lambda 2, \lambda 3 \ldots \lambda n$ is inputted from port 1 of circulator A102, and the chirped grating fiber unit 101 decides which wavelength will be reflected. If wavelength $\lambda 2$ needs to make dispersion compensation, then optical signal $\lambda 2$ is reflected and other wavelengths $\lambda 1, \lambda 3 \ldots \lambda n$ are not reflected. The non-reflected optical signals $\lambda 1, \lambda 3, \ldots \lambda n$ are directly sent to port 2 of the circulator B102 through the chirped grating fibers. The reflected optical signal $\lambda 2$ is took-off from port 3 of the circulator A102 and sent to port 1 of the circulator B102 through a fiber. The optical signal, inputted to port 1 of the circulator B102, is sent to the second chirped grating fiber through the circulator B102 for dispersion compensation, and reflected to the port2 of the circulator B102 to combine with other optical wavelengths signals. Finally, all wavelengths signal is outputted to the line by port3 of the circulator B102. Therefore, an optical signal with wavelength $\lambda 2$, needed to compensate, passes through the chirped grating fiber unit 101 twice, and makes two times dispersion compensation.

Figure 2:
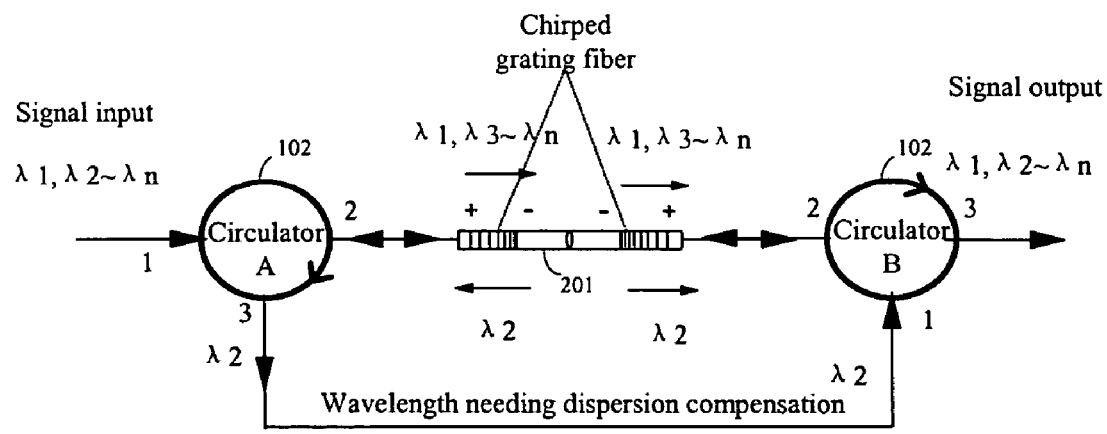
FIG. 2 shows a schematic diagram of the second scheme of the first embodiment.

Besides, The wavelength band of two chirped grating fibers should be totally the same, and constitute a dispersion compensation module. A wavelength needed to compensate is determined by the reflection wavelength of the two chirped grating fibers which are oppositely set. The chirped grating fiber unit can be as shown in FIG. 1, where two portions, set oppositely, of chirped grating fiber are written on a fiber segment. It can be also as shown in FIG. 2, where two portions, set oppositely, of chirped grating fiber are melted to form a whole. Moreover, the dispersion compensation type of the chirped grating fiber unit can also be determined by the real requirement. If two chirped grating fibers, set oppositely, of a chirped grating fiber unit are connected with their two negative poles, as shown in FIG. 1, and their two positive poles are the external ends, then the unit inserts a negative dispersion, which can compensate a positive dispersion in a line. If two chirped grating fibers, set oppositely, of a chirped grating fiber unit are connected with their two positive poles and their two negative poles are the external ends, then the unit inserts a positive dispersion, which can compensate a negative dispersion in a line. Besides, bandwidth of the chirped grating fiber unit can be different: one wavelength, broadband, wavelength tunable or other modes. If the bandwidth of the chirped grating fiber unit is one wavelength as shown in FIG. 1, then the module can only compensate one wavelength dispersion. If the bandwidth of the chirped grating fiber unit is multiple wavelengths, i.e. broadband, then the module can make a broadband compensation, for example, simultaneously making $\lambda 1, \lambda 2, \lambda 3$ dispersion compensation. If the chirped grating fiber unit is bandwidth tunable, then the module is a dynamic dispersion compensation module. For example, suppose in embodiment of FIG. 1 it is necessary to make a λ3 dispersion compensation, by tuning the tunable chirped grating fiber unit to reflect the λ3 optical signal, the λ3 optical signal is compensated. The above mentions are only different with selection of a chirped grating fiber unit, but the connection manner, structure and dispersion compensation procedure are all same with the FIG. 1 device.

Figure 3:
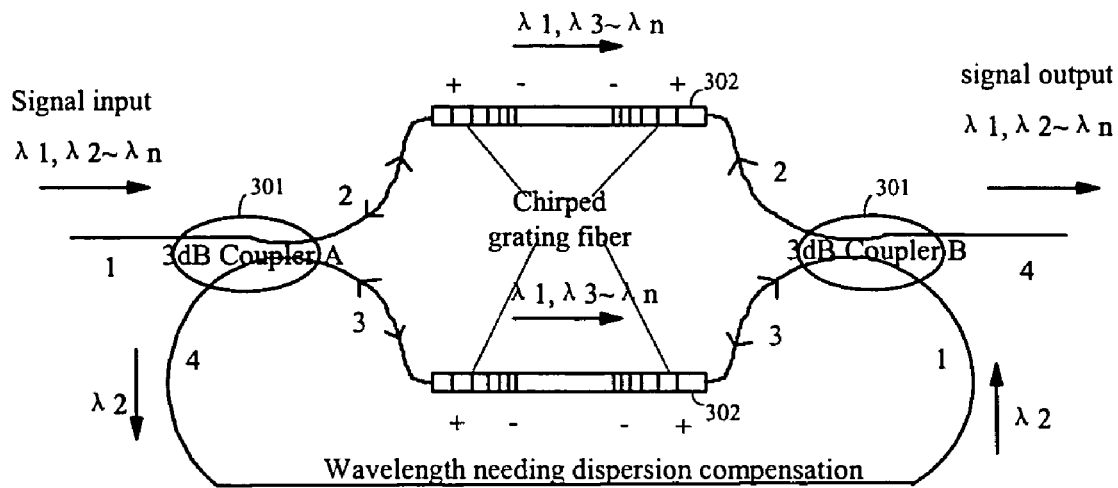
FIG. 3 shows a schematic diagram of the first scheme of the second embodiment.

The optical path selector can be replaced by an optical coupler. In this case, the on-line dispersion compensation device of the invention is shown in FIG. 3. Differences between FIG. 3 embodiment and FIG. 1 embodiment are as follow: the optical coupler 301 in FIG. 3 replaces the circulator 102 in FIG. 1, and two chirped grating fiber units 302 are serially connected between two couplers 301, respectively. In this embodiment, a 3 dB coupler 301 is used as an optical path selector. One end of two chirped grating fiber units 302 is connected with arm2 and arm3 of the coupler A301, respectively, another end of these two chirped grating fiber units 302 is connected with arm2 and arm3 of the coupler B301, respectively. Arm4 of the coupler A301 is connected with arm1 of the coupler B301. Arm1 of the coupler A301 is the optical signal input, and arm4 of the coupler B301 is the optical signal output.

When signal compensating, an optical signal consisted of multiple wavelengths λ1, λ2, λ3. An is inputted to arm1 of the coupler A301 and divided into two signals outputted from arm2 and arm3 of the coupler A301, respectively. The two output signals enter the two chirped grating fiber units 302, respectively, and are determined by the chirped grating fibers which wavelength will be compensated. If wavelength λ2 needs to be compensated, then the chirped grating fibers reflects the λ2 wavelength optical signal. The reflected signal enters the coupler A301 again through arm2 and arm3 and outputs from arm4. Then the outputted signal from arm4 has been compensated once, i.e. the first time dispersion compensation. Optical signal with other than λ2 wavelengths reaches arm2 and arm3 of the coupler B301 by passing through the gratings. The optical signal outputted from arm4 of the coupler A301 enters to arm1 of the coupler B301 directly and is divided into two signals which enter another end of the opposite direction chirped grating fiber units 302. After the second time dispersion compensation, the two signals enter the coupler B301 through arm2 and arm3 and combine with other passing through signals to form an output signal at arm4 of the coupler B301.

By adjusting length of arm2 and arm3 of coupler A301 and coupler B301, an optical signal reflected from the gratings can be better coupled to arm4 of coupler A301 and coupler B301 and outputted. In this way, insertion loss will be decreased and reached a level for practical use. Therefore, this kind of structure, with precisely adjustable arms, is suitable to waveguide design. Since waveguide integration is easy to integrate 3 dB couplers or circulators with waveguide gratings, so this kind of dispersion compensation module connection is suitable to waveguide integrated technology.

Figure 4:
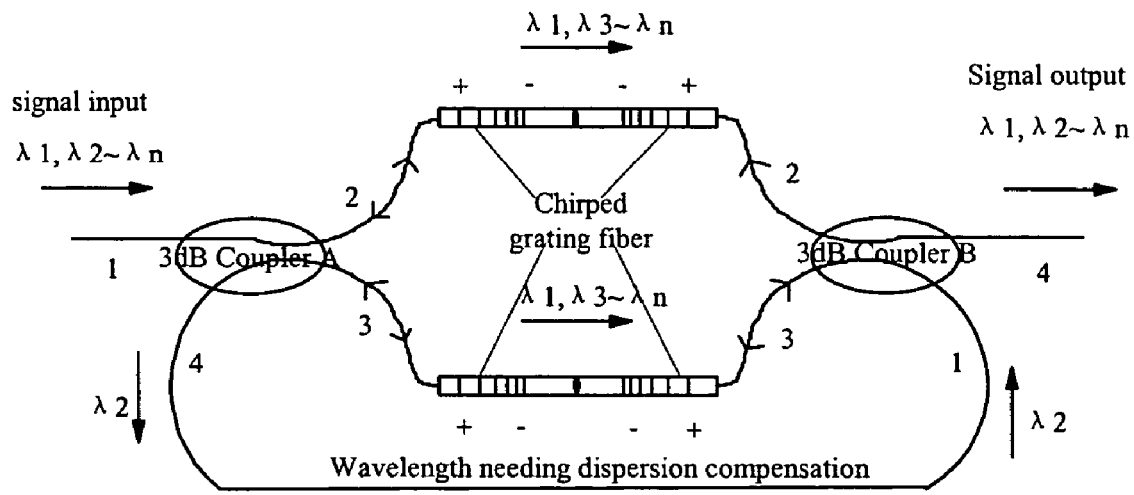
FIG. 4 shows a schematic diagram of the second scheme of the second embodiment.

The chirped grating fiber units 302 can also apply the structure that two chirped grating fibers, set oppositely, are melted together. In this case, connection mode of the chirped grating fiber units 302 and couplers 301 is shown in FIG. 4, and the dispersion compensation principle and procedure is same as the embodiment shown in FIG. 3.

Of course, the circulators and couplers can be replaced by other types of devices which have performance same as circulators and couplers. Therefore, the above mention is only some better embodiments of the invention, it by no means restricts the protection scope of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An on-line dispersion compensation device for a wavelength division optical transmission system, comprising:
   two 2*2 optical couplers, and
   two chirped grating fiber units, serially connected between the two optical couplers, respectively; which are used for selecting, reflecting and dispersion compensating at least one wavelength inputted and bypassing other wavelengths inputted; wherein
   first ports of the two chirped grating fiber units is respectively connected with two arms of a first port of the first optical coupler;
   second ports of the two chirped grating fiber units is respectively connected with two arms of a first port of the second coupler;
   one arm of a second port of the first coupler is connected with the optical signal input of the device;
   one arm of a second port of the second coupler is connected with the optical signal output of the device; and
   the other arm of the second port of the first coupler is connected with the other arm of the second port of the second coupler.

2. The device according to claim 1, wherein the chirped grating fiber unit is consisted of two opposite portions of chirped grating fibers written on a fiber segment.

3. The device according to claim 1, wherein the chirped grating fiber unit is consisted of two chirped grating fibers set oppositely and melted together as a whole.

4. The device according to claim 1, wherein bandwidth of the chirped grating fiber unit is one wavelength or multiple wavelengths or tunable wavelengths.

* * * * *